United States Patent
Koide

(10) Patent No.: US 7,859,457 B2
(45) Date of Patent: Dec. 28, 2010

(54) ANTENNA DEVICE FOR USE IN VEHICLE

(75) Inventor: Shirou Koide, Anjo (JP)

(73) Assignee: Denso Corporation, Kariya (JP)

( * ) Notice: Subject to any disclaimer, the term of this patent is extended or adjusted under 35 U.S.C. 154(b) by 145 days.

(21) Appl. No.: 12/379,504

(22) Filed: Feb. 24, 2009

(65) Prior Publication Data
US 2009/0224971 A1 Sep. 10, 2009

(30) Foreign Application Priority Data
Mar. 10, 2008 (JP) ............... 2008-059634

(51) Int. Cl.
*G01S 19/35* (2010.01)
*G01S 19/36* (2010.01)
(52) U.S. Cl. .............. 342/357.75; 342/357.76
(58) Field of Classification Search .......... 342/357.75, 342/357.76
See application file for complete search history.

(56) References Cited

U.S. PATENT DOCUMENTS

| 6,002,363 | A | 12/1999 | Krasner |
| 6,107,960 | A | 8/2000 | Krasner |
| 7,173,574 | B2 | 2/2007 | Koide |
| 7,609,748 | B2 * | 10/2009 | Karlsson ............ 375/141 |

FOREIGN PATENT DOCUMENTS

| JP | A-05-034431 | 2/1993 |
| JP | A-08-329385 | 12/1996 |
| JP | A-2001-153944 | 6/2001 |
| JP | A-2006-128807 | 5/2006 |
| JP | A-2006-333414 | 12/2006 |
| JP | A-2008-005468 | 1/2008 |
| JP | A-2008-022492 | 1/2008 |
| WO | WO 02/11470 | 2/2002 |

* cited by examiner

*Primary Examiner*—Thomas H Tarcza
*Assistant Examiner*—Harry Liu
(74) *Attorney, Agent, or Firm*—Posz Law Group, PLC

(57) ABSTRACT

A GPS signal from a GPS antenna is provided not only for a navigation apparatus through an amplifier but also for a data communication module (DCM) through a TEL antenna for establishing communication with a station for data exchange, by devising high frequency switches that is controlled by an ON/OFF of an antenna power supply on both of an input side and an output side of the amplifier. When the amplifier is in operation, one of the switches is turned on for distributing the GPS signal to a TEL antenna side. When the amplifier is not in operation, the other switch is turned on for transmitting the GPS signal from the GPS antenna to the TEL antenna side. In this manner, the GPS signal is provided for both of the navigation apparatus and the data communication module without deteriorating signal quality from the GPS antenna.

2 Claims, 3 Drawing Sheets

FIG. 3A
| ANT PW | SW1 | SW2 |
|---|---|---|
| ON | OFF | ON |
| OFF | ON | OFF |
FIG. 3B
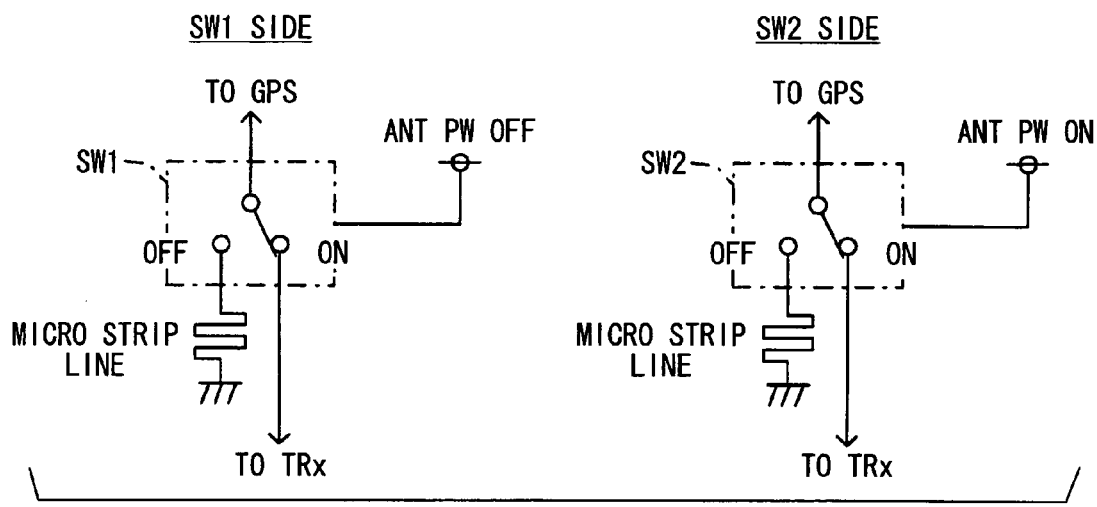
FIG. 3C
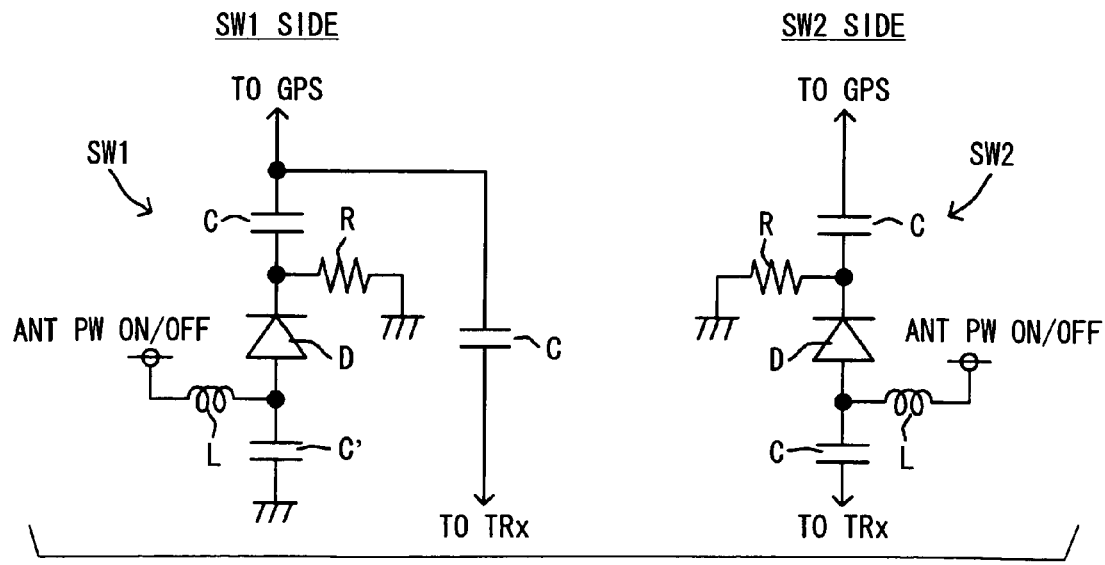

ANTENNA DEVICE FOR USE IN VEHICLE

CROSS REFERENCE TO RELATED APPLICATION

The present application is based on and claims the benefit of priority of Japanese Patent Application No. 2008-59634, filed on Mar. 10, 2008, the disclosure of which is incorporated herein by reference.

FIELD OF THE INVENTION

The present disclosure generally relates to a GPS antenna device for use in a vehicle.

BACKGROUND INFORMATION

Conventionally, an automotive vehicle having a navigation apparatus is equipped with an antenna device for receiving a GPS radio wave and for inputting a received GPS signal to the navigation apparatus (i.e., a GPS receiver in the navigation apparatus) through a wiring such as a co-axial cable.

The antenna device has, in addition to a GPS antenna element for receiving the GPS radio wave, an amplifier for amplifying the GPS signal in the GPS radio wave to a certain level (see Japanese patent document JP-A-2008-5468, paragraph [0003], for example).

When the antenna device is used in the vehicle, a power supply for the amplifier is controlled by the same switch (e.g., an accessory switch in the vehicle) for controlling the power supply for the navigation apparatus for the purpose of synchronous operation of the amplifier and the navigation apparatus.

On the other hand, a data communication module (DCM) is known as a communication device that is used in the vehicle for sending and receiving various information to and from a station, in order for the station to monitor the vehicle, or to send, to the vehicle, information that is required for vehicle control (see Japanese patent document JP-A-2006-128807, paragraph [0015], for example).

Further, the DCM may have a function for position detection that is used in, for example, a cellular phone to send the position information of the vehicle to the station. That is, a technique for locating a current position on the station side (a so-called gpsOne technique (Registered Trademark)) by sending data in the GPS signal to the station, in case that the current position of, for example, the cellular phone cannot be detected based on the GPS signal received through a built-in GPS antenna element (see Japanese patent document JP-A-2008-22492, paragraph [0030], for example).

By applying the above-described technique to the DCM for use in the vehicle, an accurate position of the vehicle is notified to the station in case of an accident, or a theft even when the GPS signal cannot be properly received by the GPS antenna element.

Therefore, when both of the DCM having the position detection function and the navigation apparatus are disposed on the same vehicle, the GPS antenna element for the navigation apparatus and the GPS antenna element for the DCM are also disposed on the same vehicle.

Both of the GPS antenna elements have the same resonance frequency for utilizing the same frequency band of the GPS radio wave. Therefore, if both of the two antenna elements are disposed at positions close to each other, the antenna elements influence with each other due to the overlapping of the resonance frequency band.

When the two antenna elements have to be used in one vehicle, in order to avoid the mutual influence, the GPS antenna element for the communication device is, for example, disposed on the roof of the vehicle, and the GPS antenna element (having the amplifier combined therein) for the navigation apparatus is disposed in an inside of the compartment of the vehicle. That is, by disposing the two antenna elements apart from each other in the same vehicle, the reception characteristics of the desired level are achieved by avoiding the mutual influence caused by interference.

In recent years, due to the antenna integration in progress, the antenna for the DCM communication device and the antenna for GPS radio wave are usually disposed as a single antenna device integrated in one package.

Further, in a sheer pressure of the antenna integration of these days, the DCM antenna device packing, in one package, both of the communication antenna element and the GPS antenna element is requested to be combined with another antenna device for the navigation apparatus.

Therefore, both of the two GPS antenna elements for the DCM and for the navigation apparatus are disposed at close positions in one package, with compromise, by allowing the performance deterioration, because the antenna integration of combining these different types of antennas in one package deteriorates, so far, the performance of the antenna due to the interference between the two GPS antenna elements using the same frequency band. In this case, the C/N (Carrier-Noise) ratio of the GPS signals to be input respectively to the navigation apparatus and the communication device (i.e., the DCM) is deteriorated, thereby compromising the measurement accuracy of each of the DCM and the navigation apparatus.

Alternatively, a single GPS antenna element may be shared by the navigation apparatus and the communication device for solving the above problem. However, the shared use of the single GPS antenna element by the different devices leads to the distribution loss that also deteriorates the input level of the GPS signal for each of the two devices if the GPS signal is simply distributed to the two devices, thereby causing the compromise and the deterioration of measurement accuracy of each of the two devices.

SUMMARY OF THE INVENTION

In view of the above and other problems, the present disclosure provides an antenna device for use in a vehicle having a GPS antenna element that can be shared by a navigation apparatus and a communication device without deteriorating a GPS signal distributed for each of the sharing devices.

In an aspect of the present disclosure, the antenna device has, as in conventional device, a GPS antenna element, an amplifier for amplifying a GPS signal from the GPS antenna element, and a first terminal for outputting the amplified GPS signal from the amplifier.

Further, the antenna device has a communication antenna element for sending and receiving a communication radio wave, and a second terminal for connecting the communication antenna element to the communication device.

When the amplifier in the antenna device is in operation, a signal separation unit separates a part of the GPS signal transmitted from the amplifier to the first terminal on a communication antenna element side for mixing the separated GPS signal with a reception signal from the communication antenna element, and for outputting the mixed signal from the second terminal to the communication device.

When the amplifier is not in operation, a route switch unit switches an GPS signal output route from the GPS antenna element from a route on an amplifier side to a route on the communication antenna element side, for mixing the GPS signal with the reception signal from the communication antenna element, and for outputting the mixed signal from the second terminal to the communication device.

Therefore, the antenna device of the present disclosure distributes the GPS signal amplified by the amplifier to the navigation apparatus and the communication device through the first and the second terminals while the amplifier is in operation in synchronization with the navigation apparatus, and outputs the GPS signal received by the GPS antenna element to the communication device through the second terminal without any modification while the amplifier is not in operation, that is, when the operation of the amplifier is stopped together with the navigation apparatus in a parking condition of the vehicle or the like.

Therefore, the GPS signal to the communication device through the second terminal is output without lowering the signal level after receiving the signal by the antenna element. Further, the navigation apparatus can also have an output of the GPS signal from the first terminal without a drop of the signal level, because the signal level can be adjusted by controlling the gain of the amplifier.

That is, the antenna device of the present disclosure not only enables a shared use of the single GPS antenna element by the navigation apparatus and the communication device, but also prevents the drop of the signal level of the GPS signal for each of the connected devices, thereby enabling the deterioration of the measurement accuracy in each of the connected devices.

In the above-described disclosure, the antenna device always outputs to the communication device from the second terminal to the mixed signal of the reception signal from the communication antenna element and the GPS signal without regard to the operation condition of the amplifier (and the navigation apparatus). This operation scheme is adopted due to the difference of the purpose and the operation conditions of the communication device and the navigation apparatus. That is, the communication device is required to be operated even when the navigation apparatus is not in operation, such as at a time of the parking condition of the vehicle or the like, for the purpose of establishing a communication with a station.

In other words, in the present disclosure, in view of this particular difference of the operation conditions, by switching the signal transmission route of the GPS signal from the GPS antenna element to the second terminal, the deterioration of the signal quality of the GPS signal is prevented for both of the navigation apparatus and the communication device.

BRIEF DESCRIPTION OF THE DRAWINGS

Objects, features, and advantages of the present disclosure will become more apparent from the following detailed description made with reference to the accompanying drawings, in which:

FIGS. 3A to 3C are a diagram and illustrations of high frequency switches in terms of an operation configuration and circuit configurations.

DETAILED DESCRIPTION

Figure 1:
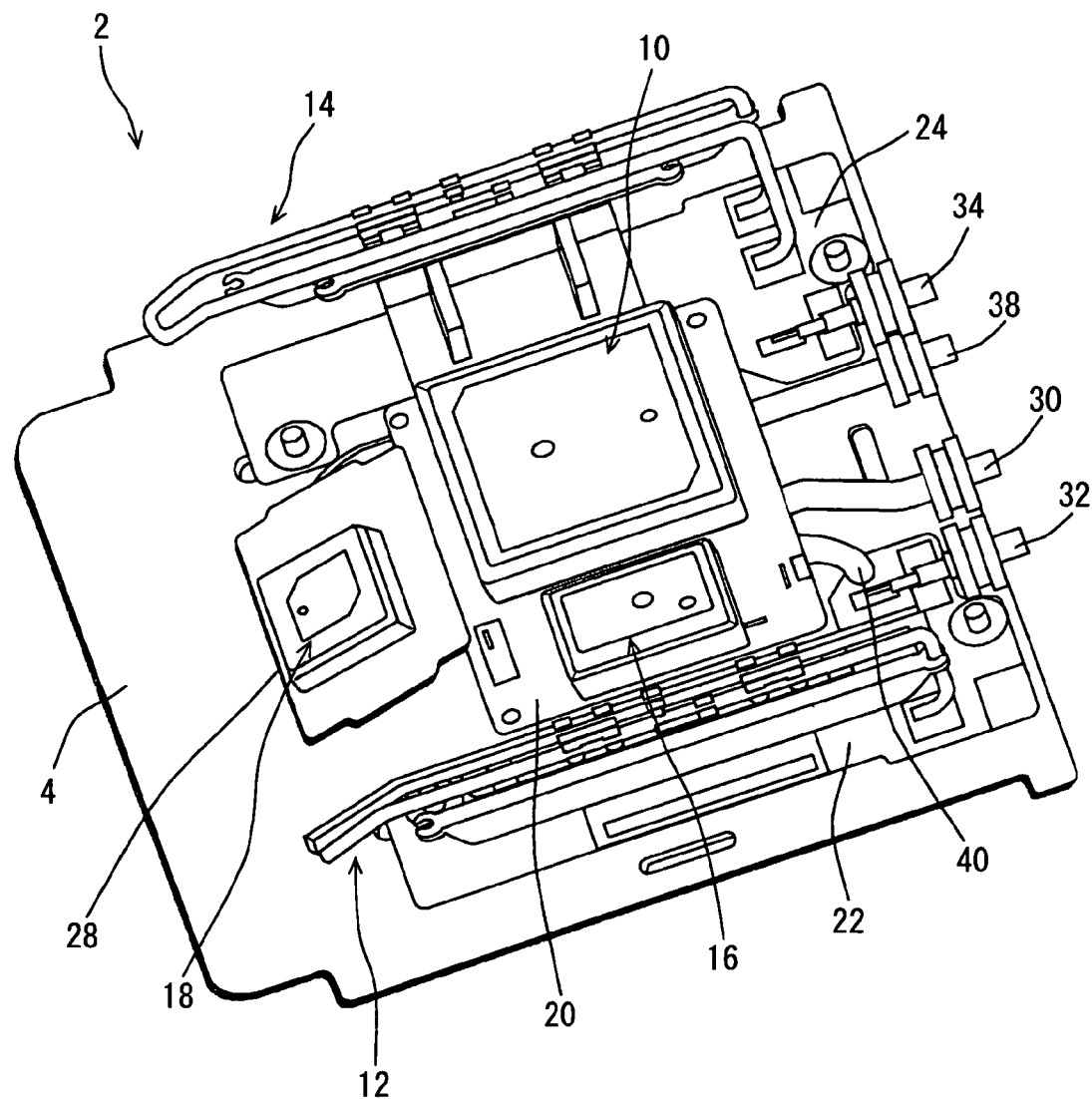
FIG. 1 is a perspective view of an antenna device for use in a vehicle in an embodiment of the present disclosure.
Figure 2:
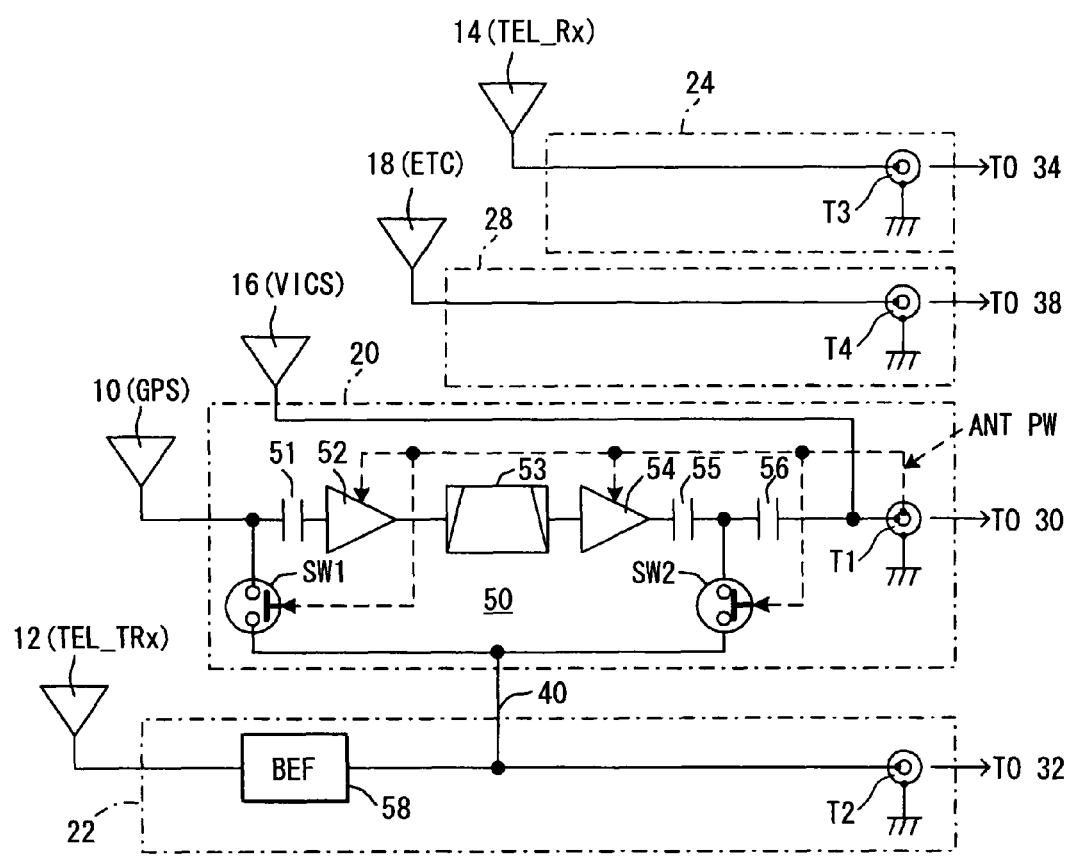
FIG. 2 is a block diagram of circuit configuration of the antenna device in the embodiment of the present disclosure.

The embodiment of the present invention is described with reference to the drawing. FIG. 1 is a perspective view showing a composition of an antenna device 2 for use in the vehicle in the present embodiment, and FIG. 2 is a block diagram of a circuit configuration of the antenna device 2.

The antenna device 2 for the vehicle in the present embodiment is an integrated antenna composed by the assembly of a global positioning system (GPS) antenna element 10, TEL antenna elements 12 and 14, a vehicle information and communication system (abbreviated to "VICS": the system is implemented and in use in Japan) antenna element 16, and an ETC antenna element 18 disposed on a ground board 4 having conductivity, and is stored in a package for installation in a position in a compartment of the vehicle as shown in FIG. 1.

Here, the GPS antenna element 10 is used to receive the electric wave for GPS transmitted by the space satellite, and is assembled on an amplification circuit board 20 with which an amplification circuit 50 (FIG. 2) to amplify the reception signal (signal for GPS) is implemented.

Further, the VICS antenna element 16 is used to receive the transmission electric wave (an electric wave for VICS) from a VICS center that delivers traffic information, and is assembled to the amplification circuit board 20 together with the GPS antenna element 10.

The reception signal (a signal for VICS) from the VICS antenna element 16 is mixed with the signal for GPS amplified with the amplification circuit 50 on the amplification circuit board 20 as shown in FIG. 2, and the mixture signal is output to the navigation apparatus installed in the vehicle through a terminal T1 formed as a conductive pattern on the circuit board 20 and the coaxial cable 30 for the navigation apparatus connected to the terminal T1.

Next, the TEL antenna elements 12 and 14 are used for data communication module (DCM) installed in the vehicle to perform a prescribed wireless communication to base stations through wireless telephone communication channels. One of those elements, that is, the TEL antenna element 12 is dedicated for transmission and reception (TRx), and the other TEL antenna element 14 is dedicated for reception (Rx) only. Each of those elements 12 and 14 is assembled to substrates 22 and 24 that are respectively dedicated for use by the DCM (FIG. 1).

Further, the terminals T2 and T3 (FIG. 2) to connect coaxial cables 32 and 34 for DCM are formed as a conductive pattern on each of the DCM substrates 22 and 24, and each of the TEL antenna elements 12 and 14 are connected to the DCM in the vehicle through the DCM coaxial cables 32 and 34 connected to the terminals T2 and T3.

The DCM has the positional detecting function as described in the paragraphs of the background information section, and the GPS signal received with the GPS antenna element 10 is output to the DCM through the following components, that is, high frequency switches SW1, SW2 (FIG. 2), and a distribution coaxial cable 40, the DCM substrate 22, the terminal T2, and the DCM coaxial cable 32.

Further, the ETC antenna element 18 is used to perform wireless communication between a roadside unit in a toll booth of an expressway, for example, and an on-board equipment for ETC (Electronic Toll Collection), that is, for paying the toll fee. The ETC antenna is assembled to an ETC substrate 28 dedicated for ETC (FIG. 1).

The ETC substrate 28 has a terminal T4 (FIG. 2) for the connection to an ETC coaxial cable 38 formed as a conductive pattern or the like. The ETC antenna element 18 is connected to an ETC on-board equipment in the vehicle through the coaxial cable 38 connected with the terminal T4.

Each of the above-mentioned antenna elements 10 to 18 is assembled integrally on the ground board 4 by fixing the substrates 20 to 28, to which the respective antenna elements 10 to 18 are assembled.

The amplification circuit 50 formed on the amplification circuit board 20, that is, a so-called low noise amplifier (LNA), is composed by the arrangement of a coupling capacitor 51, a former step amplification circuit 52, a band-pass filter 53 for selective-filtering of the GPS signal, a latter step amplification circuit 54, and coupling capacitors 55, 56 in the order of description on the transmission route for transmitting the GPS signal from the GPS antenna element 10 to the terminal T1 as shown in FIG. 2.

The VICS antenna element 16 is connected to the transmission route between the terminal T1 through the electric supply line. The GPS signal and the VICS signal are mixed at the connection point to be output from the terminal T1 to the navigation apparatus.

Further, two high frequency switches SW1 and SW2 that can switch passage/interception of the GPS signal are installed on the amplification circuit board 20. One end of each of these high frequency switches SW1, SW2 is respectively connected to an input route of the GPS signal from the GPS antenna element to the amplification circuit 50 (i.e., the coupling capacitor 51), and to an output route of the GPS signal from the amplification circuit 50 to the connection point between the GPS signal and the VICS signal (i.e., the point between the coupling capacitors 55 and 56).

Further, the other end of each of the high frequency switches SW1 and SW2 is respectively connected to the transmission route for transmission of a communication signal (TRx) formed no the DCM substrate 22 through the coaxial cable 40 that is commonly used for signal distribution to each of the switches. The transmission route is used to transmit the communication signal (TRx) between the TEL antenna element 12 and the terminal T2. In the transmission route, the band eliminator 58 (BEF) is installed on a TEL antenna element 12 side of the connection point of the distribution coaxial cable 40 to obstruct the passage of the GPS signal.

Next, the amplification circuit 50 (i.e., the former step amplification circuit 52 and the latter step amplification circuits 54) is configured to be operated by having an antenna power supply (an power-supply voltage) supplied for the terminal T1 through the coaxial cable 30 as shown by a dotted line in FIG. 2 when the navigation apparatus is in operation. Each of the above-mentioned high frequency switches SW1 and SW2 is turned on and off by the antenna power supply.

That is, the high frequency switch SW1 installed on the input side of the amplification circuit 50 for the GPS signal is configured to be (a) turned off when the antenna power supply is turned on (i.e., when the navigation apparatus and the amplification circuit 50 are in operation), and to be (b) turned on when the antenna power supply is turned off (i.e., when the navigation apparatus and the amplification circuit 50 are not in operation, that is, operation of both devices are stopped), as shown in FIG. 3A. Further, the high frequency switch SW2 installed on the GPS signal output side of the amplification circuit 50 is configured to be (a) turned on when the antenna power supply is turned on, and to be (b) turned off when the antenna power supply is turned off.

Therefore, when the navigation apparatus and the amplification circuit 50 is in operation, the high frequency switch SW1 is turned off and the high frequency switch SW2 is turning on, thereby enabling the distribution of the GPS signal amplified with the amplification circuit 50 to a terminal T1 side and to a DCM substrate 22 side.

As a result, a mixture of the GPS signal and the VICS signal is, from one of the distributed signals, output to the navigation apparatus from the terminal T1, and, from the terminal T2 to the DCM, a mixture of the GPS signal and the reception signal from the TEL antenna element 12, which is derived from the other one of the distributed signals.

On the other hand, when the operation of the navigation apparatus and the amplification circuit 50 is stopped, the high frequency switch SW1 is turned on and the high frequency switch SW2 is turned off, thereby inputting the GPS signal received with the GPS antenna element 10 to the DCM substrate 22 through the coaxial cable 40 for distribution.

Then, the GPS signal input to the DCM substrate 22 is mixed with the reception signal received with the TEL antenna element 12, and is output from terminal T2 to the DCM. Further, in this case, because the operation of the amplification circuit 50 is being stopped, the GPS signals are exclusively transmitted to a DCM substrate 22 side without being distributed to an amplification circuit 50 side.

Thus, the GPS signal amplified with the amplification circuit 50 is distributed to the terminal T1 side and the DCM substrate 22 side when the amplification circuit 50 for the GPS signal is in operation, in order to be output respectively to the navigation apparatus and to the DCM. When the amplification circuit 50 is not in operation, the GPS signal transmission route for transmitting the GPS signal from the GPS antenna element 10 is switched to a DCM substrate 22 side, thereby preventing the attenuation of the output of the GPS signal to the DCM.

Therefore, the GPS signal is prevented from deterioration of signal quality to be supplied for the navigation apparatus and the DCM for maintaining measurement accuracy in those devices, together with the shared use of the GPS antenna element 10 by both of the navigation apparatus and the DCM in the antenna device 2 for use in the vehicle in the present embodiment.

In other words, the deterioration of the C/N ratio of the GPS signal input through the coaxial cables 30 and 32 to the navigation apparatus and the DCM is prevented, because the GPS signal having the high level signal amplified with the amplification circuit 50 can be supplied to the navigation apparatus and the DCM when the amplification circuit 50 is in operation.

Further, the GPS signal can be continuously supplied to the DCM when the amplification circuit 50 is stopped. That is, though the GPS signal is not amplified, the transmission route switched by the high frequency switch SW 1 enables a continuous output of the GPS signal to the DCM.

Further, in the antenna device 2 in the present embodiment, the transmission route of the communication signal (TRx) for connecting the TEL antenna element 12 and the terminal T2 has the band eliminator (BEF) that obstructs the passage of the GPS signal on a TEL antenna element 12 side of the distribution coaxial cable 40 connection point. Therefore, oscillation of the amplification circuit 50 is prevented, because the GPS signal input into the transmission route from the distribution coaxial cable 40 is prevented from being radiated from the TEL antenna element 12 as well as prevented from being picked up by the amplification circuit 50.

In the present embodiment, the terminal T1 installed in the amplification circuit board 20 corresponds to a first terminal of the present invention, the TEL antenna element 12 corresponds to a communication antenna element, the terminal T2 installed in the DCM substrate 22 corresponds to a second terminal, the high frequency switch SW2 installed on an output side of the amplification circuit 50 corresponds to a signal separation unit, the high frequency switch SW1 installed on an input side of the amplification circuit 50 corresponds to a route switch unit, and the band eliminator (BEF) 58 corresponds to a signal process unit.

The high frequency switches SW1 and SW2 may be mechanical switches having contact points as illustrated in FIG. 3B (i.e., as in a SW1 side and a SW2 side), or may be electronic switches using the semiconductor elements such as PIN diodes D as illustrated in FIG. 3C (i.e., a SW1 side and a SW2 side).

When the high frequency switch SW1 is the mechanical switch, the switching of the transmission route is performed in the following manner. That is, when the antenna power is not supplied as shown in FIG. 3B (SW1 side), the switch SW1 is turned on as illustrated, thereby connecting the transmission route of the GPS signal with the transmission route of the communication signal (TRx). When the antenna power is supplied, the switch SW1 is turned off, thereby preventing the flow of the GPS signal into a high frequency switch SW1 side by connecting GPS signal transmission route to a microstrip line or a ¼ wave-length stub causing the high frequency switch SW1 side to have a high impedance in high frequency.

Further, when high frequency switch SW2 is the machine switch, the switching of the transmission route is performed in the following manner. That is, when the antenna power is supplied as shown in FIG. 3B (SW2 side), the switch SW2 is turned on as illustrated, thereby connecting the transmission route of the GPS signal with the transmission route of the communication signal (TRx). When the antenna power is not supplied, the transmission route of the GPS signal is configured to be connected to the microstrip line or a ¼ wave-length stub.

On the other hand, the SW1 is the electronic switch, the SW1 is configured in the following manner. That is, the PIN diode D is installed between a pair of capacitors C, C' as illustrated in FIG. 3C (SW1 side), as well as connecting the anode side of the PIN diode D with the power supply line (i.e., the antenna power supply) through a coil L for blocking the high frequency signal, and connecting the cathode side of the PIN diode D to the ground through a resistor R for limiting an electric current.

Then, the other end of the capacitor C that has one end connected to the PIN diode D on one side (i.e., a cathode side in FIG. 3C) is connected to the transmission route of the GPS signal, and the other end of the capacitor C' having a high impedance in high frequency that has one end connected to the PIN diode D on the other side (i.e., an anode side in FIG. 3C) is connected to the ground, thereby connecting the transmission route of the GPS signal with the transmission route of the communication signal (TRx) through the capacitor C.

In the above-described manner, when the antenna power supply is turned on for supplying power to the PIN diode D, the transmission route of the GPS signal having the high impedance in high frequency is connected to the capacitor C', thereby making the high frequency switch SW1 side have the high impedance in high frequency for transmitting the GPS signal received with the GPS antenna element 10 to an amplification circuit 50 side.

Further, a high frequency switch SW1 side is put in an open state in high frequency, when the antenna power supply is turned off and power supply for the PIN diode D is stopped. As a result, an amplification circuit 50 side is also put in an open state, due to the stoppage of the operation of the amplification circuit 50. Therefore, the GPS signal received with the GPS antenna element 10 is transmitted to the transmission route of the communication signal (TRx) through the capacitor C.

Next, when the high frequency switch SW2 is the electronic switch, the switch SW2 is configured in the following manner. That is, as in the case of the SW1, the PIN diode D is installed between a pair of capacitors C, with the anode side of the PIN diode D is connected to the power supply line (i.e., the antenna power supply) through the coil L for blocking the high frequency signal, and with the cathode side of the PIN diode D connected to the ground through the resistor R for limiting the current as shown in FIG. 3C (SW2 side).

Further, the other end of the capacitor C that has one end connected to the PIN diode D on one side (i.e., a cathode side in FIG. 3C) is connected to the transmission route of the GPS signal, and the other end of the capacitor C that has one end connected to the PIN diode D on the other side (i.e., an anode side in FIG. 3C) is connected to the transmission route of the communication signal (TRx).

In the above-described manner, when the antenna power supply is turned on and the PIN diode D is put in an energized condition, the transmission route of the GPS signal and the transmission route of the communication signal (TRx) are connected for transmitting the high frequency signal. Further, when the antenna power supply is turned off and the power supply for the PIN diode D is stopped, a connection between the transmission route of the GPS signal and the transmission route of communication signal (TRx) are blocked to disable the transmission of the high frequency signal.

Although the present disclosure has been fully described in connection with preferred embodiment thereof with reference to the accompanying drawings, it is to be noted that various changes and modifications will become apparent to those skilled in the art.

For instance, the amplification circuit board 20 and the DCM substrate 22 may be formed as a single substrate for accommodating a function of the distribution coaxial cable 40 on a circuit pattern on the substrate, though, in the above embodiment, the distribution coaxial cable 40 is described as a part that is used to transmit the GPS signal from the GPS signal transmission route formed on the amplification circuit board 20 to the communication signal transmission route formed on the DCM substrate 22 that is configured to have a separate body from the amplification circuit board 20.

Further, the TEL antenna element 12 (14) may be used as an antenna for the cellular phone in the above embodiment, though the TEL antenna element 12 (14) is described as a part that is connected to the DCM in the vehicle in the above embodiment. In the above-described manner, the GPS signal is provided for the cellular phone from the GPS antenna element for vehicular use having the higher performance instead of the internal GPS antenna element disposed in the cellular phone, thereby enabling the improvement of the measurement accuracy by using a technique known as gpsOne (Registered trademark) in a GPS device.

Furthermore, in the above embodiment, by having the band eliminator (BEF) 58 installed in the transmission route of the communication signal (TRx), a radiation of the GPS signal being input through the distribution coaxial cable 40 from the TEL antenna element 12, to be picked up by the amplification circuit 50, is prevented. The oscillation prevention scheme may have different implementation as long as the positive feedback of the GPS signal to the amplification circuit 50 is prevented. That is, the transmission route of the communication signal (TRx) may have a phase shifter instead of the band eliminator (BEF), and the phase of the GPS signal output to a TEL antenna element 12 side may be adjusted by using the phase shifter. In this manner, the oscillation of the amplification circuit can be prevented.

Such changes, modifications, and summarized scheme are to be understood as being within the scope of the present disclosure as defined by appended claims.

What is claimed is:

1. An antenna device for use in a vehicle having a GPS antenna element for receiving a GPS signal, an amplifier for amplifying the GPS signal received by the GPS antenna element, and a first terminal for outputting an amplified GPS signal amplified by the amplifier to a navigation apparatus, the device comprising:

a communication antenna element for sending and receiving a communication radio wave;

a second terminal for connecting a communication device to the communication antenna element;

a signal separation unit for separating a part of the GPS signal transmitted from the amplifier to the first terminal on a communication antenna element side, for mixing the separated GPS signal with a reception signal from the communication antenna element, and for outputting the mixed signal from the second terminal to the communication device, when the amplifier is in operation; and a route switch unit for switching an output route of the GPS signal from the GPS antenna element from a route on an amplifier side to a route on the communication antenna element side, for mixing the GPS signal with the reception signal from the communication antenna element, and for outputting the mixed signal from the second terminal to the communication device, when the amplifier is not in operation, wherein the amplifier is configured to be operated in synchronization with the navigation apparatus.

2. The antenna device of claim 1 further comprising:

a signal process unit for adjusting a phase of the GPS signal for preventing one of (a) passing of the GPS signal and (b) a positive feedback of the GPS signal from the communication antenna element to the amplifier, wherein the signal process unit is disposed on a communication antenna element side relative to a mixing position in a transmission route of the reception signal from the communication antenna element to the second terminal, the mixing position mixing the reception signal and the GPS signal by one of the signal separation unit and the route switch unit.

* * * * *